(12) United States Patent
Chiang

(10) Patent No.: US 10,802,798 B1
(45) Date of Patent: Oct. 13, 2020

(54) OPTICAL IDENTIFICATION RECORD SYSTEM

(71) Applicant: AMPUS TECHNOLOGY CO., LTD., New Taipei (TW)

(72) Inventor: Ming-Jen Chiang, New Taipei (TW)

(73) Assignee: AMPUS TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 16/848,450

(22) Filed: Apr. 14, 2020

(30) Foreign Application Priority Data

Aug. 19, 2019 (TW) .............................. 108210953 U

(51) Int. Cl.
| | | |
|---|---|---|
| *G11B 17/03* | (2006.01) | |
| *G06F 7/32* | (2006.01) | |
| *G10H 1/00* | (2006.01) | |
| *G11B 17/035* | (2006.01) | |
| *G11B 3/00* | (2006.01) | |

(52) U.S. Cl.
CPC ............. *G06F 7/32* (2013.01); *G10H 1/0041* (2013.01); *G11B 3/008* (2013.01); *G11B 17/035* (2013.01)

(58) Field of Classification Search
CPC ......... G06F 7/32; G10H 1/0041; G11B 3/008; G11B 17/03

USPC ......................................................... 369/216
See application file for complete search history.

(56) References Cited

U.S. PATENT DOCUMENTS

| | | | | |
|---|---|---|---|---|
| 4,114,893 A | * | 9/1978 | Leach ................. | G11B 3/0957 369/203 |
| 5,463,613 A | * | 10/1995 | Forsell .................... | G11B 3/60 369/264 |
| 7,512,320 B2 | * | 3/2009 | Yokota ................. | G10H 1/0041 386/248 |
| 10,607,634 B1 | * | 3/2020 | Lavoie ............... | G11B 3/08512 |
| 2008/0132329 A1 | * | 6/2008 | Jorasch ............... | G07F 17/3244 463/25 |
| 2019/0287553 A1 | * | 9/2019 | Byerly .................... | G11B 3/34 |

* cited by examiner

*Primary Examiner* — Allen T Cao
(74) *Attorney, Agent, or Firm* — Muncy, Geissler, Olds & Lowe, P.C.

(57) ABSTRACT

An optical identification record system is provided that combines physical record with digital music. The optical identification record system includes a record and a record player. The surface of the record is printed with optical identification codes. The record player includes a turntable, a first motor, a tone arm, a processor, a memory, and a second motor. The turntable of the record player is used to rotate the record. The tone arm includes a cartridge that reads the optical identification codes on the surface of the record to decode a corresponding audio file for playing.

19 Claims, 2 Drawing Sheets

OPTICAL IDENTIFICATION RECORD SYSTEM

TECHNICAL FIELD

The present invention relates to a record system, especially relates to an optical identification record system that combines a physical record with digital music.

BACKGROUND

Phonograph is a device used for mechanical recording and sound reproduction. Thomas Alva Edison created the phonograph in 1877. It was also known as a gramophone or record player. The waveform of sound vibration is carved, etched, cut or stamped into the surface groove of the record. In order to produce sound, the record is rotating and the stylus is rubbed along the groove to produce vibration, so that the recorded sound can be reproduced very weakly.

From the 1970s to the 1990s, compact cassettes and vinyl records were the two most popular storage formats for recording music. Compact disc (CD) came into being in 1982. After the late 1990s, it became the mainstream product of physical record. It is still the standard storage device of commercial recording.

Due to the continuous evolution of digital technology, in recent years, legal online music stores have been set up to operate in the form of digital download and streaming media.

Despite the current streaming music, the physical record has never disappeared. Consumers' purchase of physical records is not only a support for music creators, but also a manifestation of collection aesthetics.

SUMMARY OF THE INVENTION

The invention proposes an optical identification record system of combining a physical record with digital music.

According to one aspect of the invention, an optical identification record system having a record with an optical identification code on its surface and a record player is proposed, wherein the record player comprises a turntable to support the record; a first motor to drive the turntable to rotate; a tone arm to capture an image of the optical identification code; a processing unit to decode the image to obtain an encoding corresponding to the optical identification code; a memory coupled to the processing unit to store an audio file corresponding to the encoding; and a second motor to drive the tone arm to rotate.

According to another aspect of the invention, the optical identification record system further comprises a speaker to play the audio file corresponding to the encoding.

According to yet another aspect of the invention, the optical identification record system further comprises a wireless transmission module which is wirelessly connected with a Bluetooth speaker, and the audio file corresponding to the encoding is played through the Bluetooth speaker. In one embodiment, the wireless transmission module is establishing a Bluetooth connection or a wireless connection with a mobile device, and an audio file transmitted from the mobile device is played through at least one speaker.

According to an aspect of the invention, the record player comprises a memory slot for a memory inserted therein.

According to one aspect of the invention, a first end of the tone arm is connected with a rotation shaft of the tone arm, and the second motor is used to drive the rotation shaft of the tone arm to rotate.

According to one aspect of the invention, a second end of the tone arm has a cartridge in which an image sensor is arranged to capture the image of the optical identification code.

According to another aspect of the invention, the record player comprises a display screen to display a playing status and control information.

According to one aspect of the invention, a material of the record includes carton board.

According to one aspect of the invention, a material of the record includes plastic, graphite or metal.

According to another aspect of the invention, playing mode of the record includes encrypted mode and unencrypted mode.

According to the optical identification record system provided by the invention, high-quality lossless digital music can be provided. In addition, playing program of the record is similar to that of a traditional record player and retains a "sense of ritual" of playing music. The encryption method can prevent music songs from being stolen and improperly reproduced.

BRIEF DESCRIPTION OF THE DRAWINGS

The present invention can be understood by utilizing several preferred embodiments in the specification, the detailed description and the following drawings. The same element symbols in the drawings refer to the same elements in the present invention. However, it should be understood that all preferred embodiments of the present invention are only used for illustrative purposes, and not intended to limit the scope of the application.

DETAILED DESCRIPTION

In order to give examiner more understanding of the features of the present invention and advantage effects which the features can be achieve, some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
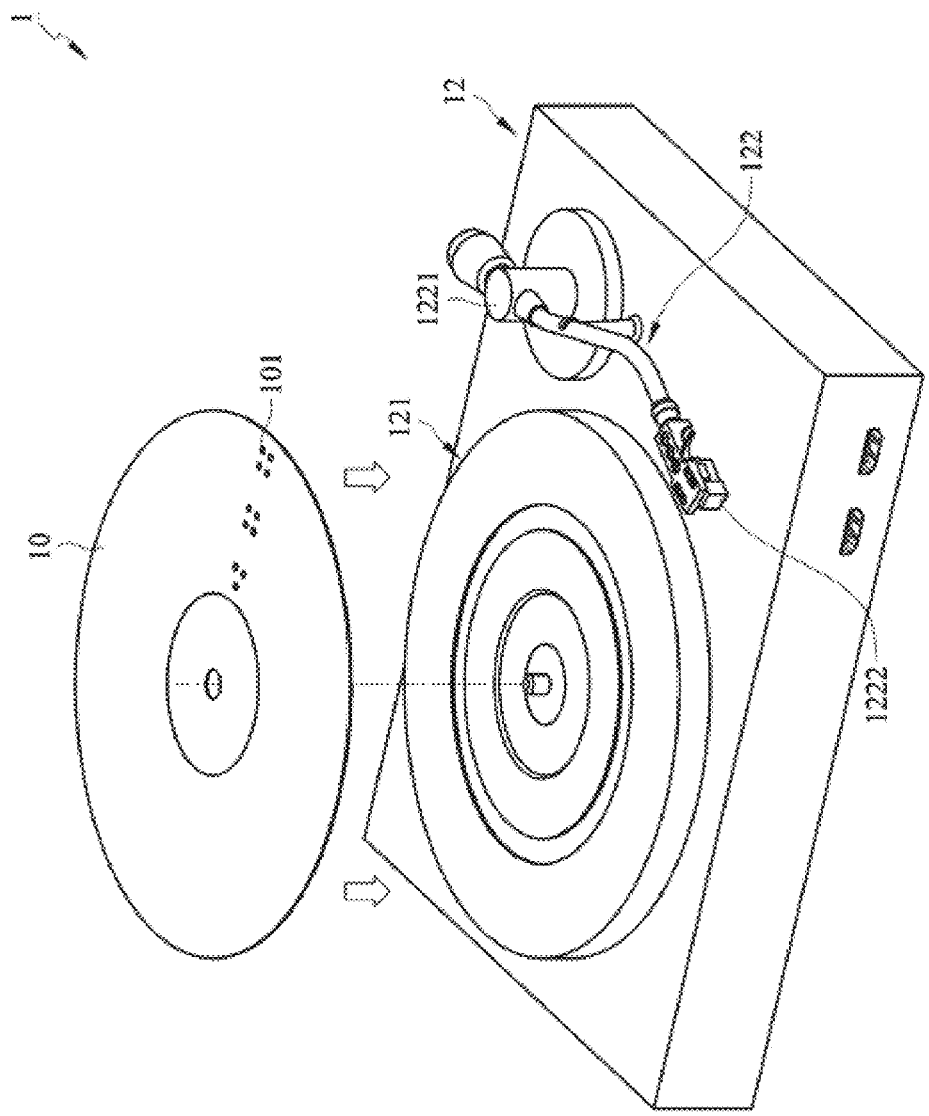
FIG. 1 shows a stereo diagram of an optical identification record system according to an embodiment of the invention.
Figure 2:
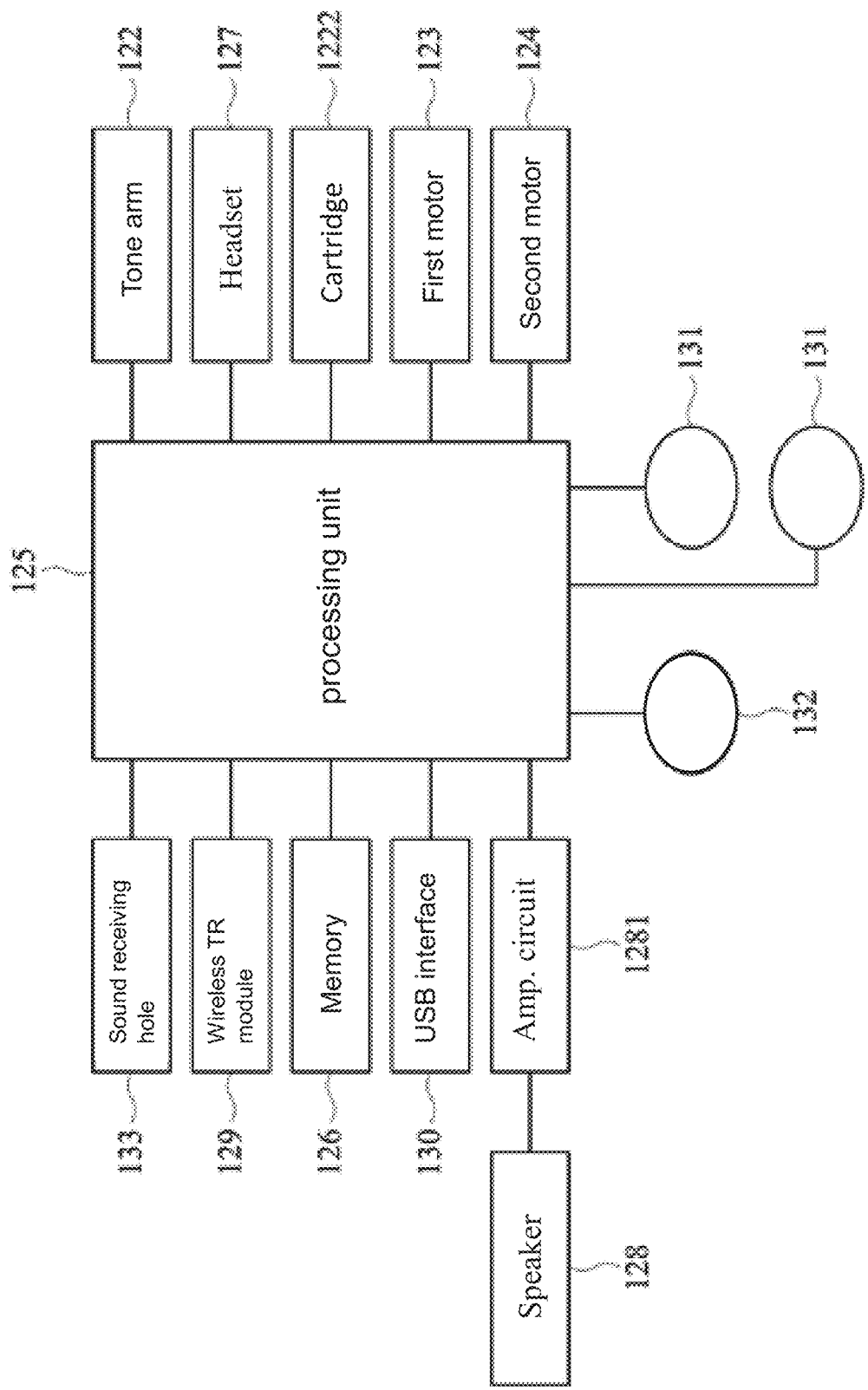
FIG. 2 shows a block diagram of an optical identification record system according to an embodiment of the invention.

FIG. 1 illustrates a schematic diagram of an optical identification record system according to an embodiment of the invention. FIG. 2 illustrates a block diagram of a record player of an optical identification record system according to an embodiment of the invention. As shown in FIG. 1, the optical identification record system 1 includes a record 10 and a record player (phonograph) 12.

Referring to FIG. 1, the surface of the record 10 is printed with a plurality of optical identification codes 101 which are difficult to be distinguished by naked eyes. The optical identification codes 101 may be a traditional array pattern or any combination of numbers, characters, and symbols as described in the applicant's previous application for Taiwan patent application No. 106119436, filing date on Jun. 12, 2017. The above Taiwan patent incorporated herein shall be deemed as part of the specification of this application.

Referring to FIG. 1 and FIG. 2, the record player 12 is used to play the disc record 10. In this embodiment, the record player 12 includes a turntable 121, a tone arm 122, a first motor 123, a second motor 124, a processing unit 125, and a memory 126. The disc record 10 is placed on the turntable 121. The first motor 123 is used to drive the turntable 121 to rotate. In one embodiment, the first motor 123 drives the turntable 121 to rotate through a belt (not shown). In one embodiment, the first motor 123 directly drives the turntable 121 to rotate. The tone arm 122 is used for capturing the images of the optical identification codes 101. The second motor 124 is used to drive the tone arm 122 to rotate. In detail, one end of the tone arm 122 can be connected with a rotation shaft 1221 of the tone arm, while the second motor 124 drives the rotation shaft 1221 of the tone arm to rotate. The other end of the tone arm 122 has a cartridge 1222, in which an image sensor (not shown) is arranged, such as a complementary metal oxide semiconductor (CMOS) image sensor, which is used to capture the images of the plurality of optical identification codes 101. When the second motor 124 drives the rotation shaft 1221 of the tone arm to rotate, the cartridge 1222 gradually moves along the radius direction, so that the cartridge 1222 sequentially captures the images of the plurality of optical identification codes 101. In one embodiment, the record player 12 has a play key. When the play key is pressed, the first motor 123 drives the turntable 121 to rotate, and the second motor 124 drives the rotation shaft 1221 of the tone arm to rotate. In one embodiment, when the user moves the tone arm 122 by hand to or near the turntable 121, the first motor 123 drives the turntable 121 to rotate, and the second motor 124 drives the rotating shaft 1221 of the tone arm to rotate.

Referring to FIG. 1 and FIG. 2, the processing unit 125 includes one or more integrated circuit (IC). The processing unit 125 is used to decode the image captured by the cartridge 1222 to obtain an encoding corresponding to the captured optical identification code 101.

Referring to FIG. 1 and FIG. 2, in this embodiment, the record player 12 has a memory 126. In a preferred embodiment, the memory 126 may store a plurality of audio files corresponding to a plurality of encodings which correspond to a plurality of optical identification codes 101, respectively. In a preferred embodiment, the record player 12 includes a memory slot (not shown), and the memory 126 may be inserted into the slot by the user. In one embodiment, memory 126 may be a secure digital memory card with a certain size. In another embodiment, the memory 126 is embedded in the record player 12. In one embodiment, the record player 12 has an embedded memory and a memory slot to set another pluggable memory, while the audio files can be stored in any memory.

Referring to FIG. 1 and FIG. 2, in one embodiment, the record player 121 may include a 3.5 millimeter (mm) standard sound hole (not shown) or other sound output hole through which the user can connect to a headset 127 or an audio equipment to listen to the corresponding encoded audio files.

Referring to FIG. 1 and FIG. 2, in one embodiment, the record player 12 also includes at least one speaker 128. For example, the bottom or side of the record player 12 can be configured with two speakers 128 to play the corresponding encoded audio files. The audio signal to be played can be processed through at least one amplification circuit 1281.

Referring to FIG. 1 and FIG. 2, in one embodiment, the record player 12 includes a wireless transmission module 129. The wireless transmission module 129 can be wirelessly connected with at least one Bluetooth speaker (not shown), and the audio files to be encoded is played through the at least one Bluetooth speaker. In one embodiment, the wireless transmission module 129 may establish a Bluetooth connection or a wireless connection with a mobile device, such as a mobile phone, and an audio file transmitted from the mobile device is played through at least one speaker 128. That is to say, the wireless transmission module 129 can be bi-directional, and establish a Bluetooth connection with the Bluetooth speaker to play the audio files to be encoded through the Bluetooth speaker, or establish a Bluetooth connection with the mobile device to play the audio files transmitted from the mobile device through the speaker 128.

Referring to FIG. 1 and FIG. 2, the record player 12 may include a display screen (not shown) to display the play and control information of the record player 12, such as the playing track, volume, network connection status, etc.

Referring to FIG. 1 and FIG. 2, in one embodiment, the power required for the record player 12 may be supplied externally. In one embodiment, the record player 12 has at least one universal serial bus (USB) interface 130, such as USB type-C, through which external power is supplied to the record player 12. In one embodiment, the record player 12 has a battery (not shown) to supply the required power.

Referring to FIG. 1 and FIG. 2, the record player 12 may have a plurality of press-buttons (keys) or switches 131. In one embodiment, the record player 12 has a power switch or knob to turn on or off the power supply. In one embodiment, the record player 12 has a knob for adjusting the volume level. In one embodiment, the power switch or knob can adjust the volume level of playing. In one embodiment, the record player 12 has a power status indicator (light).

Referring to FIG. 1 and FIG. 2, in one embodiment, the record player 12 has a rotation speed adjustment switch or key (not shown) to switch the rotation speed of the turntable 121. The rotation speed of the traditional Vinyl record player is 45 revolution per minute (rpm), 331/3 rpm, or 78 rpm, while the rotation speed of the turntable 121 can be the same or different from that of the traditional Vinyl record player.

Referring to FIG. 1 and FIG. 2, in one embodiment, the record player 12 has a recording key 132 and a sound receiving hole 133 (or a connecting hole) to connect a microphone. After the user presses the recording key 132, the sound can be recorded through the sound receiving hole 133 or the microphone, and the recorded audio file can be stored in the memory 126.

According to the invention embodiment, since the cartridge 1222 does not need to touch the surface of the record 10 when reading the optical identification code and does not rub against the record 10, the record 10 may be made of any material suitable for printing the optical identification code 101. In one embodiment, the material of the record 10 includes carton board. In one embodiment, the material of the record 10 includes plastic. In one embodiment, the material of the record 10 includes graphite or metal. The surface of the record 10 may be provided with a groove like a traditional Vinyl record player, or with a nano coating, so as to enhance the reliability of the record 10. In addition, the surface of the record 10 may be printed with black and white or color patterns. In one embodiment, the record 10 has a certain degree of transparency. The record 10 can have the same size as the traditional Vinyl record player, such as 10 inches or 12 inches. In one embodiment, the size of the record 10 is about 8 inches or less 8 inches for facilitating collection.

Referring to FIG. 1 and FIG. 2, playing mode of the record 10 includes encrypted mode and unencrypted mode. In one embodiment, the play of the record 10 is performed in encrypted mode. In one embodiment, the audio files stored in the memory body is bound with the optical identification code 101 of the record 10 by an encrypted process to achieve the protection of digital content.

According to an embodiment of the invention, the audio files played by the record 10 can be recorded by the user himself and stored in the memory 126. In one embodiment, a user may purchase a "blank record". The surface of the blank record is also printed with a plurality of optical identification codes 101. For example, each single side of the blank record is divided into 10 track areas, and the optical identification code 101 of the surface of each track area can correspond to one code. For example, the optical identification code 101 of the first surface of the record 10 corresponds to ten codes, including 1001, 1002, 1003, . . . and 1010, and the optical identification code 101 of the second surface of the record 10 corresponds to ten codes, including 2001, 2002, 2003, . . . and 2010. The user can record through the recording key 132 on the record player 12, or record by another device, and save the recorded audio files in the memory 126. The file name of the audio files may be set as 1001, 1002, . . . , 1010, 2001, 2002, . . . and 2010, etc. In one embodiment, the recorded audio files by the user can be an MP3 file (MPEG (movie picture experts group) 1 or 2 layer 3). In one embodiment, a plurality of specific codes are provided for the user to record. In one embodiment, one record 10 retains one or more codes for the user to record.

Due to the different playing principles, the single-sided playing time of the record 10 can be tens of minutes or hours or longer. In one embodiment, the playing time of the single side of the record 10 is more than several hours to reduce the number of side change.

In one embodiment, an audio file stored in the memory, or a legally authorized audio file downloaded by a record company through the network, is not an MP3 audio file, but a media file authorized by the digital rights management (DRM). These audio files cannot be transferred to general computer folders, MP3 players or burned to CD for listening. This can prevent music songs from being stolen and improperly reproduced.

According to the invention, the audio files stored in the memory 126 can be high-quality digital audio files. The audio files can be sold with the record 10, or downloaded over the Internet and stored in the memory 126. In one embodiment, the audio files stored in the memory 126 is converted from the recording master tape of the record company to the Free Lossless Audio Codec (FLAC) file, and then stored in the memory 126. The whole process is completed in the professional recording room, and does not involve any mixing and post production. In theory, it has the quality closest to the master tape.

In one embodiment, an audio file stored in memory 126, or a legally authorized audio file downloaded by a record company through a network, is stored in a format including pulse-code modulation (PCM), linear pulse-code modulation (LPCM), or direct stream digital (DSD).

According to the optical identification record system 1 provided by the invention, it can have the advantages of both digital music and physical music. First of all, the record 10 is a kind of physical record. In addition to playing high-quality non-loss digital music, the record 10 may have the same album envelope, inner page design and text introduction with the traditional Vinyl record and have a unique aesthetic feeling. For users, music is no longer "virtual", but can be real "owned". Digital music has been upgraded into an artistic and commercial entity music product.

In addition, the optical identification record system 1 provided by this invention can retain a "sense of ritual" of playing music. When listening to the traditional Vinyl record, easily broken record needs to be carefully taken out of the envelope, then put it on the record player and the tone arm is pick up, carefully dropping the cartridge and then playing it. Before long, we have to get up to change side, the whole process is tedious. However, each repetition of the "ritual of playing" can deepen the memory and give people a deeper experience. Accordingly, the sense of ritual makes a record impressive to the user, making the user feels that the money spent on the record is worth it. In the optical identification record system 1 of the invention, playing program of the record 10 is similar to that of the traditional record player, and it retains the "sense of ritual" of playing music. In addition, an encryption method is introduced to prevent music songs from being stolen and improperly reproduced.

Moreover, in the optical identification record system 1 of the invention, when the record 10 is playing, the cartridge 1222 may not contact with the record 10. Therefore, the record 10 will not be worn. The sound quality of an audio file stored in memory 126 will not be consumed by the increase in the number of playing. The preservation of the record 10 is better than that of traditional vinyl record.

According to the optical identification record system 1 provided by this invention, it not only provides high-quality lossless digital music, but also retains the integrity and concept of traditional music records, and restores the experience of music fans' appreciation and collection of records.

Each and all of the embodiments disclosed in this specification can be modified, changed, combined, exchanged, omitted, substituted, and equivalently changed by those skilled in the art. As long as they are not mutually exclusive, they belong to the concept and scope of this invention. The structure or method corresponding to or related to the features of the embodiments described in this application, and/or any application, abandoned or approved application of the invention or the assignee, are incorporated herein and deemed as part of the specification of this application. The incorporated parts include part or all of its corresponding, related and modified parts, (1) operable and/or constructible parts, (2) operable and/or constructible parts modified according to those skilled in the art, (3) implementation/manufacturing/use or combination of the specification of this application, related application of this application, and any part based on the common sense and judgment of those skilled in the art.

Unless otherwise specified, some conditional sentences or auxiliary words, such as "can", "could", "might", or "may", usually attempt to express the features, elements, or steps that the embodiment of this application has but may not need. In other embodiments, these features, elements, or steps may not be required.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

What is claimed is:

1. An optical identification record player, comprising:
a turntable;
a first motor to drive said turntable to rotate;
a tone arm to capture an image of an optical identification code;
a processing unit to decode said image to obtain an encoding corresponding to said optical identification code;
a memory coupled to said processing unit to store an audio file corresponding to said encoding; and
a second motor to drive said tone arm to rotate,
wherein a first end of said tone arm is connected with a rotation shaft of said tone arm, and said second motor is used to drive said rotation shaft of said tone arm to rotate.

2. The record player of claim 1, wherein said first motor is used to drive said turntable to rotate through a belt.

3. The record player of claim 1, wherein a second end of said tone arm has a cartridge in which an image sensor is arranged to capture said image of said optical identification code.

4. The record player of claim 3, wherein said image sensor is complementary metal oxide semiconductor (CMOS) image sensor.

5. The record player of claim 1, further comprising a speaker coupled to said processing unit.

6. The record player of claim 1, further comprising an amplification circuit coupled to said processing unit.

7. The record player of claim 1, further comprising a wireless transmission module coupled to said processing unit.

8. The record player of claim 1, further comprising a memory slot for said memory inserted therein.

9. The record player of claim 1, wherein a record has said optical identification code on its surface placed on said turntable.

10. The record player of claim 9, wherein a first end of said tone arm is connected with a rotation shaft of said tone arm, and said second motor is used to drive said rotation shaft of said tone arm to rotate.

11. The record player of claim 10, wherein a second end of said tone arm has a cartridge in which an image sensor is arranged to capture said image of said optical identification code.

12. The record player of claim 1, further comprising at least one universal serial bus (USB) interface coupled to said processing unit.

13. The record player of claim 1, further comprising a recording key coupled to said processing unit.

14. The record player of claim 1, further comprising a sound receiving hole coupled to a microphone.

15. The record player of claim 1, further comprising a headset coupled to said processing unit.

16. The record player of claim 1, further comprising a switch coupled to said processing unit.

17. The record player of claim 1, wherein a material of said record includes carton board.

18. The record player of claim 1, wherein a material of said record includes plastic, graphite or metal.

19. The record player of claim 1, wherein playing mode of a record includes encrypted mode and unencrypted mode.

* * * * *